June 23, 1942.   W. W. SCOFIELD   2,287,498
HYDRAULIC WHEEL DRIVE
Filed Feb. 8, 1941   2 Sheets-Sheet 2
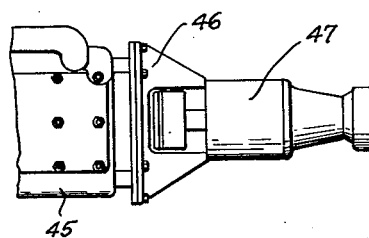
Fig. 5
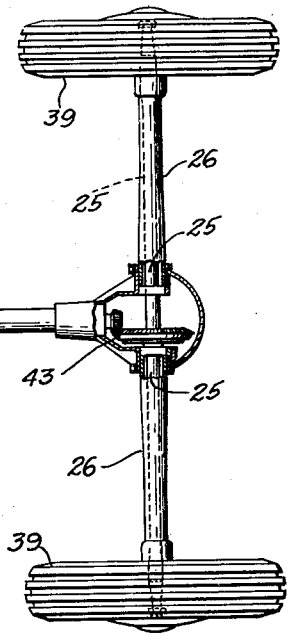
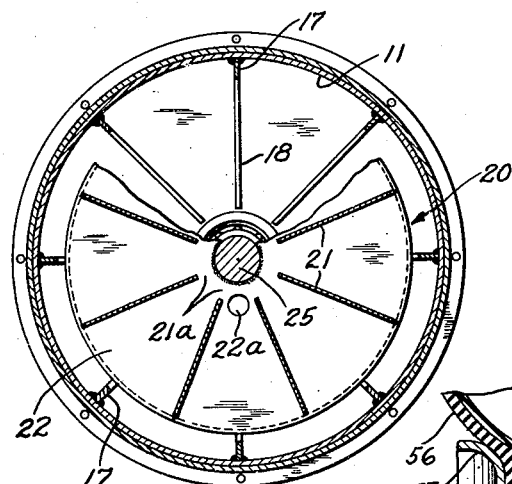
Fig. 7
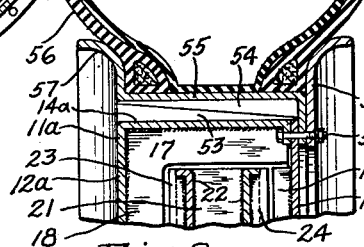
Fig. 8
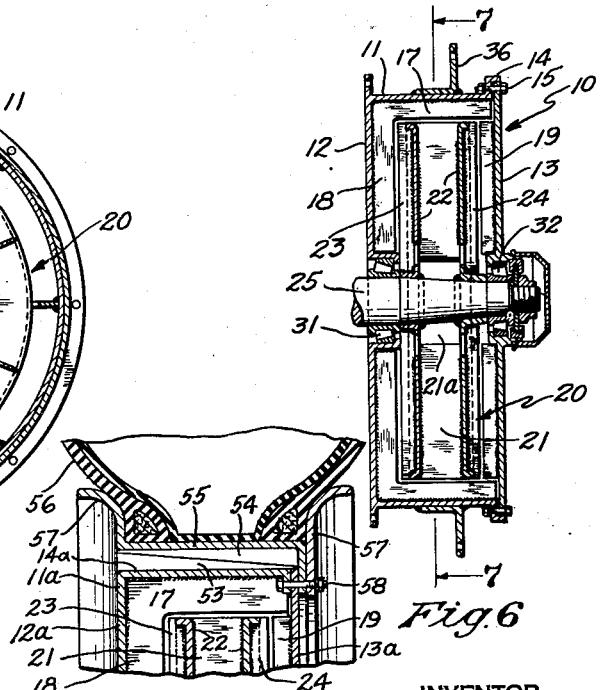
Fig. 6
INVENTOR
William W. Scofield
BY
Wooster & Davis
ATTORNEYS Patented June 23, 1942

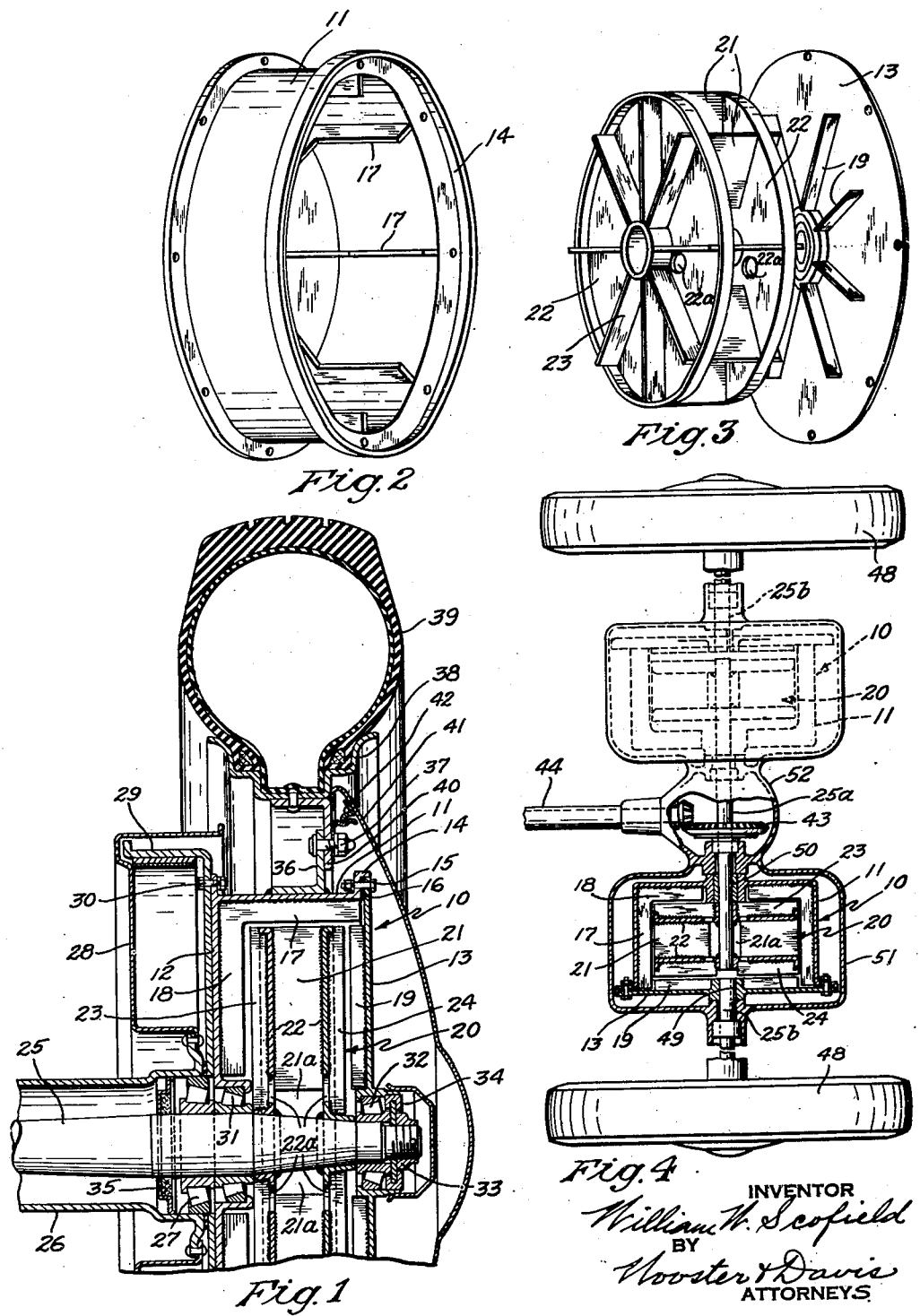

2,287,498

UNITED STATES PATENT OFFICE 2,287,498

HYDRAULIC WHEEL DRIVE

William W. Scofield, Old Greenwich, Conn.

Application February 8, 1941, Serial No. 378,117

2 Claims. (Cl. 60—54)

This invention relates to a hydraulic or liquid drive for motor vehicles, and has for an object to provide an improved and simplified construction and arrangement of this type of drive which may be used to provide an independent liquid drive for each traction wheel, and particularly a construction in which the liquid drive may be a part of the wheel itself so that there is independent traction for each wheel and costly differential gearing is eliminated and other advantages are secured.

It is also an object to provide an improved construction and an arrangement of liquid drive which, although particularly adapted for mounting and arranging as a part of the traction wheel construction, may still be used in other locations if desired.

It is a further object to provide a construction of this type of drive which may be so used that there is an equal and independent driving effect for each traction wheel, thus greatly reducing the liability of skidding and greatly improving the ability to get out of locations involving ice or mud, and thus greatly reducing the danger of getting stuck under such conditions.

With the foregoing and other objects in view I have devised the construction illustrated in the accompanying drawings forming a part of this specification. It is however to be understood that I am not limited to the specific construction and arrangement shown, but may employ various changes and modifications within the scope of the invention.

In these drawings:

Fig. 1 is a transverse section through a portion of a traction wheel showing my invention applied thereto;

Fig. 2 is a perspective view of a portion of the housing forming one part of the liquid drive;

Fig. 3 is a perspective view of the impeller and one wall of the housing in separated relation;

Fig. 4 is a partial plan view and partial section showing how the drive may be used in other locations;

Fig. 5 is a partial plan view and partial section showing how it may be arranged with respect to the motor;

Fig. 6 is a vertical section through the liquid drive unit removed from the wheel;

Fig. 7 is a section substantially on line 7—7 of Fig. 6; and

Fig. 8 is a section through a wheel showing a somewhat modified construction.

Fig. 1 as above indicated shows my improved hydraulic or liquid drive installed in and forming a part of a traction wheel such for example as one of the rear wheels of a motor car, and illustrates how my improved construction of liquid drive unit is particularly adapted for building into the wheel and forming a part of the wheel structure. This arrangement of the liquid drive unit in the wheel itself simplifies construction of the remaining portions of the car and places the unit where it is protected and out of the way, and by this arrangement secures numerous advantages not present in the usual type of drive. As there are two driving units, one for each of the rear driving wheels, the power transmitted for a given size of unit is doubled and the slip is reduced, and there is a separate and independent liquid drive for each wheel transmitting an equal and independent force to each wheel thus greatly reducing the liability of skidding or getting stuck in ice, snow or mud and eliminating the necessity of providing expensive differential gearing.

In the construction shown the driven element of the liquid drive comprises a housing 10 forming the central portion of the wheel and comprising the container for the oil forming the driving liquid. This housing may be of various constructions but in the form shown comprises a substantially cylindrical body member 11 closed at one end by the wall 12 and closed at the other end by the removable wall 13. This wall 13 is secured to the member 11 by seating at its periphery in an annular recess in the flange 14 and secured by suitable bolts 15 with suitable packing 16 between them to prevent leakage of the driving liquid. Extending inwardly from the side wall of the member 11 are vanes or fins 17, and extending inwardly from the inner surfaces of the end walls 12 and 13 are radially extending vanes or fins 18 and 19.

Associated with this housing and enclosed therein is the impeller 20 rotatable relative to the housing and comprising a series of radially extending blades 21. These may be mounted in various ways but are shown as extending between a pair of discs 22 which form a rigid support for the blades, and in effect the blades are carried to the outer sides of these discs to provide the blades or fins 23 and 24 arranged facing the vanes 18 and 19 on the housing and with their edges spaced a short distance from the inner edges of these vanes as shown. The outer free edges of the blades 21 are also spaced inwardly a short distance from the inner edges of the vanes 17, and this spacing of the edges of the blades of the impeller from the edges of the vanes of the driven member determines the amount of slip between the two elements in the driving operation for any given liquid. The impeller 20 is mounted on the axle of axle shaft 25 to be driven thereby, this axle or shaft being mounted in the axle housing 26 and running on suitable bearings 27 in the usual manner. This housing may also carry the cover 28 for the brake drum 29 mounted on the wheel, in the present case on the housing 11, it being secured thereto by any suitable means such for example as the bolts 30. Suitable openings 21a and 22a may be provided adjacent the center for circulation of the oil.

The housing 11, that is, the driven element of the liquid drive unit is mounted to rotate relative to the shaft 25. In the present case the two end walls 12 and 13 are carried on suitable bearings 31 and 32 mounted on the shaft, they being secured on the shaft by any suitable means such as the removable nut 33 associated with a suitable seal 34, and another seal 35 may be located at the inner side of the bearing 27. This arrangement of the bearings 31 and 32 for the wheel permits the use of good wide bearings and also arranging them wider apart so as to give a good rigid support and make a stronger wheel construction.

The rim and tire may be secured on the driven member or housing in various ways as desired. In the arrangement of Fig. 1 a short radially extending flange 36 is secured to the outer surface of the housing 11 and carries suitable studs or bolts 37 for securing the removable tire rim thereto. The tire rim 38 is shown as a standard drop rim construction carrying the tire 39 and is mounted on an inwardly extending flange 40 overlapping the flange 36 and secured thereto by the bolts 37. This permits easy removal or application of the tire and its supporting rim in the usual and standard manner, and after application the various parts may be enclosed by the finishing cap 41 mounted by any suitable means, such for example as the spring clips 42.

If preferred the tire rim may be mounted directly on the housing of the liquid drive unit as shown in Fig. 8. Here the housing is shown at 11a having the end walls 12a and 13a corresponding to the walls 12 and 13 of Fig. 1. Inclined ribs or supports 53 may be provided on the peripheral wall 14a and similarly inclined walls 54 on rim 55 carrying the tire 56 with the removable flange 57 permitting the removal of the tire. The rim 55 and flange 57 are secured to the housing by bolts or studs 58. This construction permits the use of a housing and impeller of maximum diameter for a given size tire.

It will be evident that as there is an independent and separate liquid drive for each wheel, each wheel may turn relative to the driving shaft independently of the other wheel and that therefore no differential gear drive is required in the rear axle. Thus as shown in Fig. 5 any standard drive may be employed for driving the rear axle or shaft from the engine. As shown the axle or shaft 25 running to both wheels is driven by any type of bevel gear drive 43 from the main drive shaft 44 from the engine indicated at 45. This liquid drive arrangement also does not require the use of a clutch and change gear transmission, but usually such devices may be provided for emergency purposes and to facilitate getting out of tight places, and also for reversing or driving backwards. Such a clutch is indicated diagrammatically at 46 and the change gear drive or transmission, particularly for reversing, being shown at 47.

This liquid drive unit is believed to be a material advance in the art as the radially extending blades of the impeller, particularly the center portions 21 thereof, through their centrifugal action on the driving liquid transmit great power to the vanes of the housing or driven member, and they can be readily widened by merely lengthening or widening the impeller and housing, thus greatly increasing the driving force or ability to transmit power for driving buses, trucks and similar heavy vehicles and to transmit the greater power required for such use. There is also effective driving force between the portions 23—24 of the blades and the vanes 18 and 19.

Although this driving unit is particularly adapted for incorporation as a part of the wheel structure, it is not limited to such use but may be used in any other location in the drive from the motor to the wheels. Thus for example as shown in Fig. 4 the axle or axle shaft 25a corresponding to the axle shaft 25 is not carried to the wheels 48, but is separated, forming two sections between the beveled gears 43 and the wheels, the other section being shown at 25b. An impeller 20 is mounted on each end of the shaft 25a to be driven thereby, and this is enclosed in the housing 11 the same as shown in Fig. 1. The impeller may rotate relative to the housing 11, but the housing is secured to the shaft section 25b by any suitable means such as being keyed thereto as shown at 49, the other bearing 50 for the housing being a running bearing on the shaft 25a. As there is thus a separate liquid drive unit for each wheel they are driven in this arrangement the same as in Figs. 1 and 5. The unit 10 is preferably enclosed in a housing 51, which may be a part of the rear axle housing and an extension of the beveled gear housing 52.

It will be apparent from the above that there is direct drive for each wheel and that no differential is required, and therefore that there is direct traction on both wheels. The slip between the impeller and the driven element in the liquid drive unit permits difference in speed in the wheels in going around curves. Also in going around a corner too fast it acts as a brake as one wheel is nearly stopped so that the impeller in that wheel acts as a brake on the other wheel and tends to reduce excessive speed. Also no gear shift is required except for reversing, although a selective gear transmission may be provided for emergency purposes. It is believed that direct traction on both wheels without driving through a differential gearing greatly reduces liability of skidding, and for this reason also there is much more traction on the two wheels on ice or in snow or mud, thus greatly reducing the liability of getting stuck under these conditions. Also the great one-sided strain caused by one wheel traction on automobiles, buses and trucks due to a necessary differential drive is practically eliminated by this drive which transmits an equal force to both rear wheels at the same time. There is ordinarily six to ten percent slip between the impeller and the driven element which is determined by the distance between the fins, blades or vanes. This acts as a cushion and permits turning of corners. This slip is greater at slow speeds so that the car is automatically checked when turning a corner at a dangerous speed. It eliminates sudden jerks, makes an easy smooth start, and reduces wear on tires and lessens the need of anti-skid chains. There is practically no wear on the impeller, therefore replacement is necessary only in case of accident.

Having thus set forth the nature of my invention what I claim is:

1. In a drive of the character described, a driving shaft, an impeller secured to said shaft to be driven thereby and including a pair of longitudinally spaced discs and radially extending blades extending between said discs and fins projecting from the outer sides of the discs, a rotatable housing enclosing the impeller and driven thereby and having peripheral and ends walls spaced from the impeller, a series of vanes on the peripheral and end walls of the housing extending inwardly toward the blades and spaced at their inner ends a short distance from the peripheral and side edges of the blades and fins respectively, and said discs having openings therethrough adjacent the inner ends of the blades to permit circulation of liquid inwardly to the spaces between the blades from the spaces between the end wall vanes.

2. In a drive of the character described, a driving shaft, an impeller secured on the shaft to be driven thereby and including a pair of laterally spaced discs, a series of blades extending radially outwardly from said shaft between the discs and radially extending fins on the outer sides of the discs, a rotatable housing enclosing said impeller and driven thereby and having a peripheral wall spaced outwardly from the outer edges of the blades and end walls spaced laterally from the discs, a series of longitudinally extending vanes at the inner side of said peripheral wall extending radially inward toward said blades with their inner edges spaced a short distance from the outer edges of said blades, a series of radial vanes on the end walls of the housing extending inwardly toward the fins and spaced at their inner edges a short distance from the edges of the fins, and means permitting circulation of liquid from the outer sides of the discs to the spaces between the discs.

WILLIAM W. SCOFIELD.